(Model.)

J. A. SOULE & D. MANUEL.
Wheel for Vehicles.

No. 241,244.  Patented May 10, 1881.

2 Sheets—Sheet 1.

Attest:
Louis Cohen.
Joseph Selig.

Inventors;
John A. Soule,
David Manuel,
per Edw. Dummer, Atty.

(Model.) 2 Sheets—Sheet 2.

J. A. SOULE & D. MANUEL.
Wheel for Vehicles.

No. 241,244. Patented May 10, 1881.

Attest;
Louis Cohen.
Joseph Selig.

Inventors;
John A. Soule,
David Manuel,
per Edw. Dummer,
Atty.

UNITED STATES PATENT OFFICE.

JOHN A. SOULE AND DAVID MANUEL, OF HYDE PARK, MASSACHUSETTS.

WHEEL FOR VEHICLES.

SPECIFICATION forming part of Letters Patent No. 241,244, dated May 10, 1881.

Application filed September 27, 1880. (Model.)

*To all whom it may concern:*

Be it known that we, JOHN A. SOULE and DAVID MANUEL, citizens of the United States, both residing at Hyde Park, in the county of Norfolk and State of Massachusetts, have invented a new and useful Wheel for Vehicles, of which the following is a specification, reference being had to the accompanying drawings.

Our invention consists in a wheel having a rim or felly of two concentic parts, and rubber or other elastic material between said parts, together with a device at the hub for pressing the spokes endwise outward to tighten the rim and set the tire; and it also consists in such further details of construction as are hereinafter described, and specifically pointed out in the claims.

Figure 1:
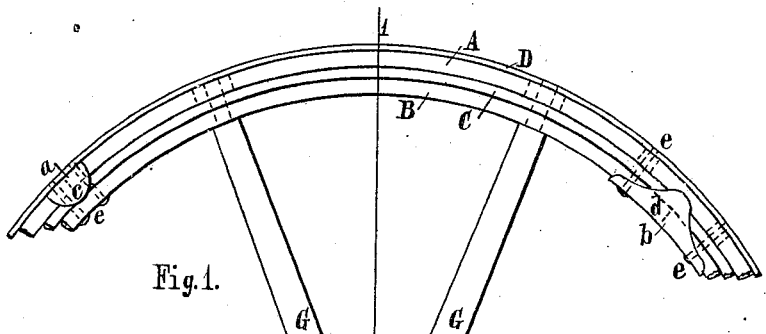
Figure 3:
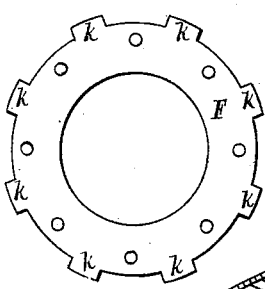
Figure 4:
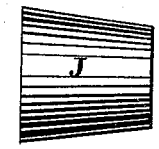
Figure 5:
Figure 2:
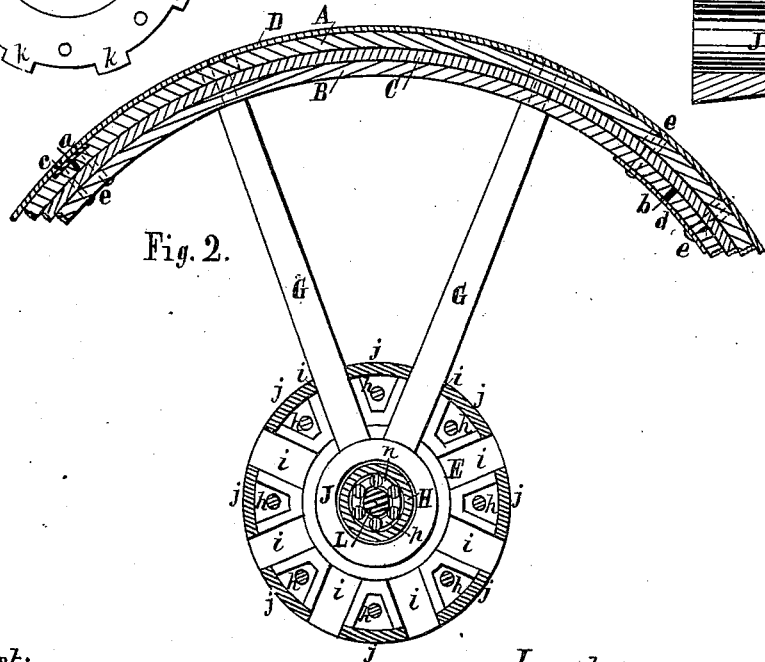
Figure 6:
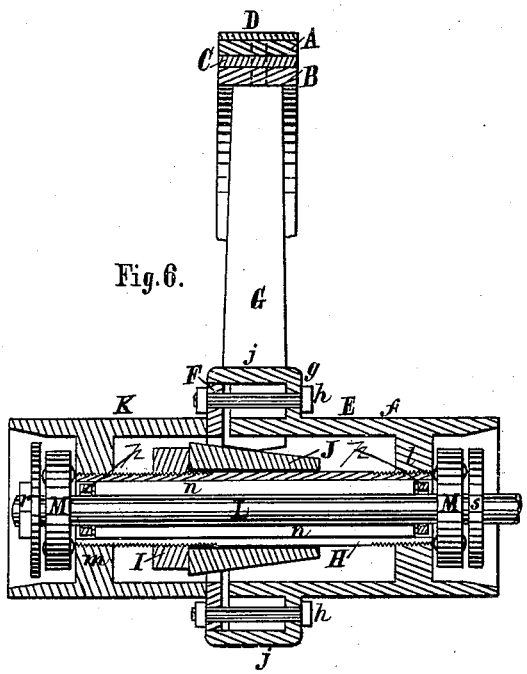
Figure 8:
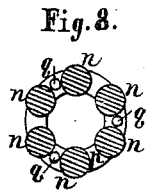
Figure 7:
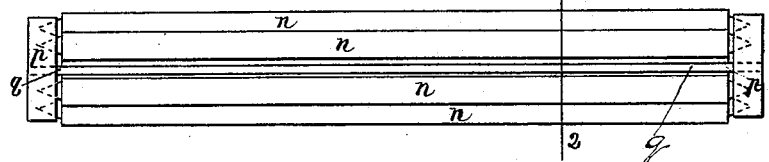
Figure 9:
Figure 10:
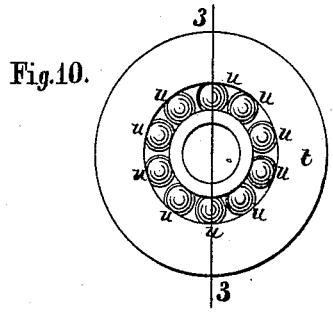
Figure 11:
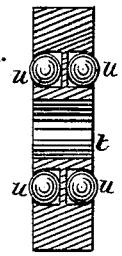

In the drawings, (two sheets,) Figure 1 is a side view of so much of a wheel embodying our invention as serves for illustration. Fig. 2 is a section taken in a plane parallel with the plane of the wheel and flush with the outer edges of the spokes. Fig. 3 is a view of the plate forming part of the hub. Fig. 4 shows the taper tube or annular wedge for pressing the spokes endwise outward. Fig. 5 is a longitudinal section of said taper tube. Fig. 6 is a section taken on line 1 1 in Fig. 1. Fig. 7 shows the friction-rollers and the rings in which are the bearings for these rollers. Fig. 8 is a section taken on line 2 2 in Fig. 7. Fig. 9 shows one of the friction-rollers. Fig. 10 is a view of the face of one of the friction-washers. Fig. 11 is a section taken on line 3 3 in Fig. 10. The figures from 7 to 11, inclusive, are drawn on a larger scale than the other figures.

The rim or felly—preferably of wood, as is common—of the wheel is formed of the two parts A and B, one about the other, having a band, C, of rubber or other elastic material, between parts A and B. The tire D is placed about the whole, as in ordinary wheels. The joint or joints *a* of the outer part, A, is in a different place, or are in different places, in the periphery than the joint or joints *b* of the part B, so that one part shall "break joint" with the other part. The parts of the rim or felly are joined, in the usual way, by means of the clasps *c* and *d*, and bolts, rivets, or screws *e*, the holes for which being slotted in the direction of the circumference, in one or the other part, to allow the proportionate relative expansion of the two parts. The mortise in one of said parts, for the tenon of each spoke, is also elongated, to provide for said expansion, as shown by dotted lines in Figs. 1 and 2.

The main body of the hub is composed of the two pieces E and F. The piece E forms one end, *f*, and the center, *g*, in which the spokes G are inserted; and the piece F forms an outer plate, to be held to the part E by bolts or screws *h*. The spokes G are so entered into the part E as to fill the recesses *i* and leave their outer edges to be covered by the plate F. The portions *j* of the outer rim of the part E, between the spokes, extend beyond the edges of the spokes, so as to leave spaces in which fit the projections *k* of the plate F. Thus, when the plate F is fastened by the bolts *h* to the part E, the former is still further secured in place by the projections *k* fitting into their places, and the better presses on the spokes to clamp them firmly.

The central tube or box, H, has screw-threads cut thereon, so that it may be screwed into the internally-projecting portion of the part E at *l*, and that a nut, I, may be screwed thereon, to press against the taper tube J, previously placed on the tube or box H. The inner ends of the spokes G bear against the circumference of the taper tube J, so that when the latter is pressed endwise by the nut I the spokes are pushed endwise outward to expand the rim of the wheel and set the tire. This operation is performed before the bolts or screws *h* are finally tightened, and when the latter is done the wheel as a whole is made firm and strong.

The shell K, which is to cover the parts inclosed therein and give shape to the outer end of the hub, is screwed onto the tube or box H by means of thread cut therein at *m*.

Friction-rollers *n* are placed within the tube or box H, about the shaft or axle L. These rollers have taper bearings *o* in rings *p* at their ends, these rings being held in position with reference to each other by rods *q*.

Between the outer nut, *r*, screwed on the axle to hold the wheel thereon, and the hub or end of the box H, is a washer, M, of peculiar construction. There is also such a washer, M, between the hub and the shoulder or flange *s* on the axle. Each washer M consists of a ring, *t*, having a number of balls, *u*, set in the ring, so that they will be more than half covered, to be clasped by the ring, and be retained therein, but project slightly and be free to revolve; and thus a rolling rather than a sliding friction will exist at the ends of the hub. Each washer may be double, as shown—that is, have a set of balls on each side—or may be single, having a set of balls on one side only.

A wheel in which the rim and tire are tightened by pressing the spokes outward by means of a device at the hub we make practical and of the necessary firmness and strength by having the two concentric parts break joint one with the other, and the mortises for the tenons of the spokes slotted in one or the other part, to allow that proportionate expansion and relative movement required.

We claim as our invention—

1. A wheel for a vehicle, having, in combination with a device at the hub for pressing the spokes endwise outward, a rim or felly of two concentric parts and rubber or other elastic material between said parts, substantially as and for the purpose set forth.

2. In a wheel for a vehicle, a rim or felly having rubber or other elastic material between two concentric parts which break joints, as specified, and have elongated mortises for the tenons of the spokes, substantially as set forth.

3. The combination of the part E, having recesses formed by the portions *j*, the part F, having the projections *k*, bolts *h*, tube or box H, having the screw-threads on each end, and the shell K, substantially as described.

4. The combination of the box H, axle L, rollers *n*, having taper bearings *o* in rings *p*, and the rods *q*, substantially as described.

5. A washer that may be placed on the shaft or axle between the wheel and a bearing, and may revolve independently of the wheel, formed of a ring or plate, *t*, having balls so set in an annular groove in one or both sides that they will project slightly, while the ring or plate forms a cap to hold the balls in said groove, substantially as specified.

JOHN A. SOULE.
DAVID MANUEL.

Witnesses:
 EDW. DRUMMER,
 H. G. MANNING.